United States Patent [19]

Schatz

[11] Patent Number: 4,643,156
[45] Date of Patent: Feb. 17, 1987

[54] INTERNAL COMBUSTION ENGINE WITH A POSITIVE DISPLACEMENT SUPERCHARGER MECHANICALLY DRIVEN FROM THE ENGINE CRANKSHAFT

[76] Inventor: Oskar Schatz, Tellhohe 14, D-8031 Stockdorf, Fed. Rep. of Germany

[21] Appl. No.: 609,927

[22] Filed: May 14, 1984

[30] Foreign Application Priority Data

May 18, 1983 [DE] Fed. Rep. of Germany ....... 3318094
May 18, 1983 [DE] Fed. Rep. of Germany ....... 3318113
May 18, 1983 [DE] Fed. Rep. of Germany ....... 3318136

[51] Int. Cl.⁴ .............................................. F02B 33/06
[52] U.S. Cl. .................................................. 123/560
[58] Field of Search ........................ 123/559, 560, 561

[56] References Cited

U.S. PATENT DOCUMENTS

| 1,576,357 | 3/1926 | Pierce | 123/560 X |
| 1,634,468 | 7/1927 | Muller | 123/560 X |
| 1,690,080 | 10/1928 | Seng et al. | |
| 2,391,163 | 12/1945 | Jessup | |
| 2,756,735 | 7/1956 | Oehrli | 123/559 |

FOREIGN PATENT DOCUMENTS

| 3027000 | 2/1982 | Fed. Rep. of Germany | 123/561 |
| 396463 | 8/1933 | United Kingdom | |
| 1024846 | 4/1966 | United Kingdom | |

*Primary Examiner*—Michael Koczo
*Attorney, Agent, or Firm*—Harness, Dickey & Pierce

[57] ABSTRACT

A piston-type internal combustion engine is fitted with a mechanically driven displacement supercharger such that the displacement volume of a supercharging chamber for compression of the combustion air is made equal to the maximum requirement of an engine cylinder to be filled. The stroke rate of the supercharger is equal to the ignition rate of the engine and the piston motion of the supercharger bears a given phase relation to the piston motion of the engine in line with the desired supercharging effect, such phase relation preferably being adjustable.

5 Claims, 13 Drawing Figures

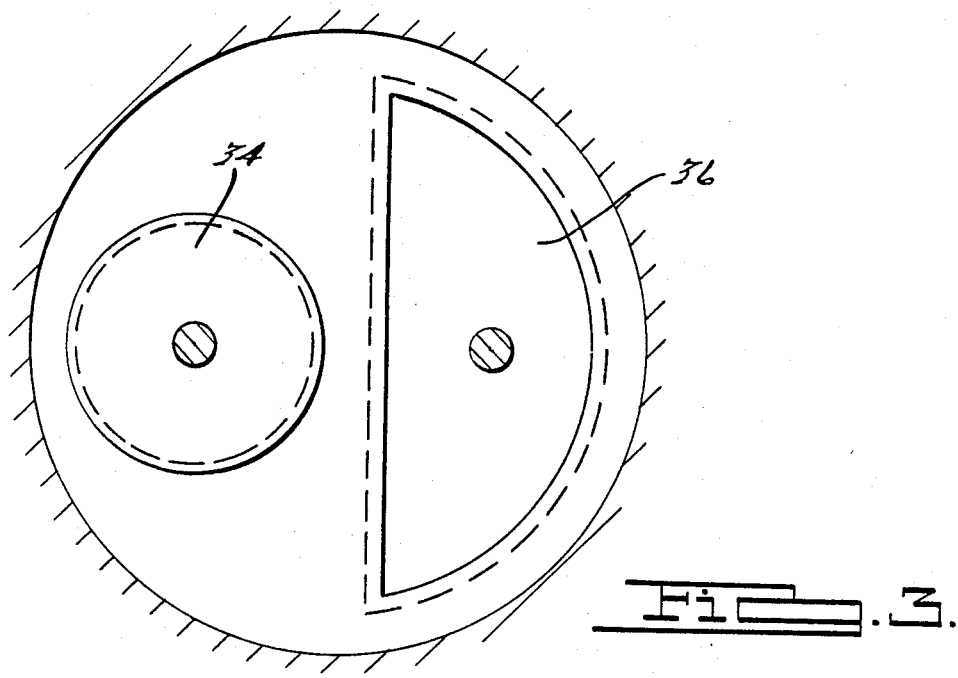
FIG. 3.
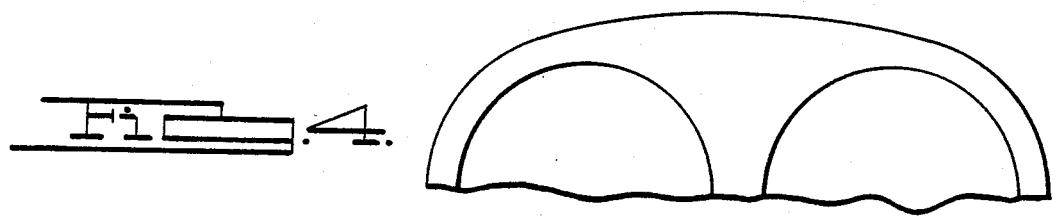
FIG. 4.
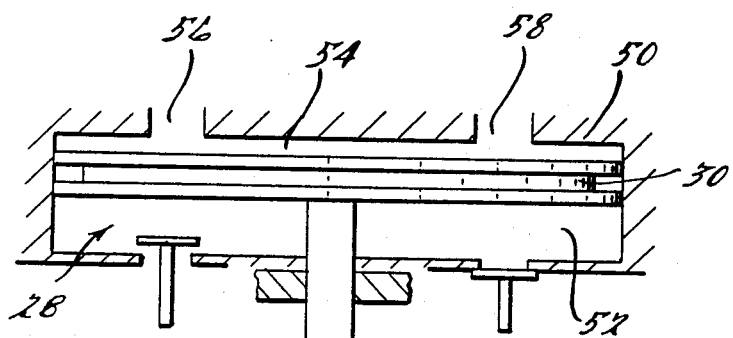
FIG. 5.
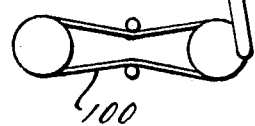

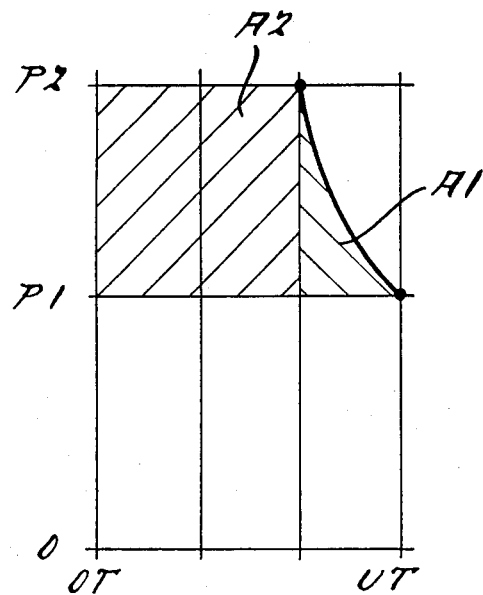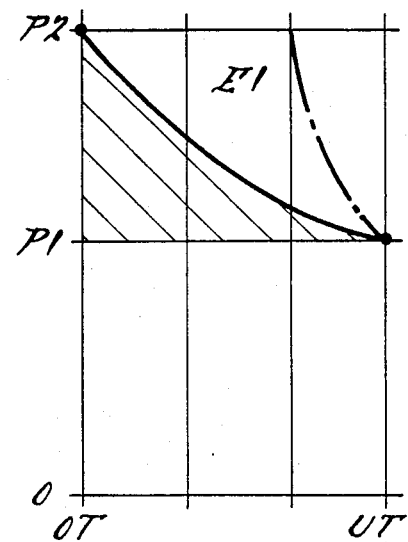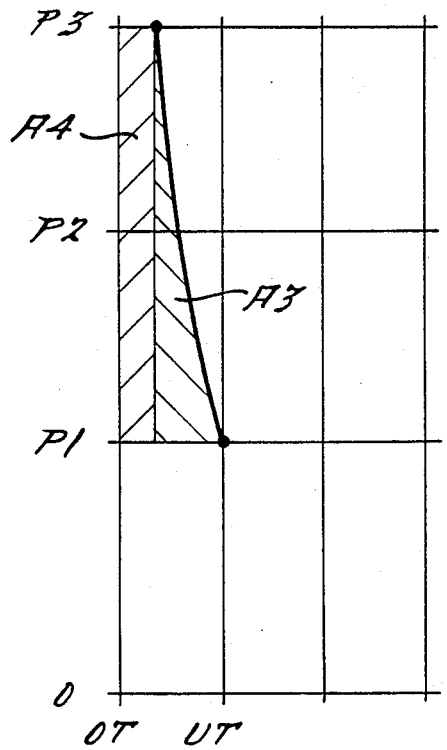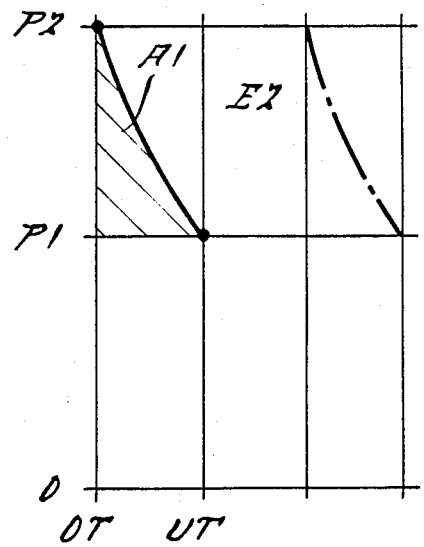

INTERNAL COMBUSTION ENGINE WITH A POSITIVE DISPLACEMENT SUPERCHARGER MECHANICALLY DRIVEN FROM THE ENGINE CRANKSHAFT

BACKGROUND AND SUMMARY OF THE INVENTION

The invention relates to an internal combustion piston engine with a positive displacement supercharger driven mechanically from the engine crankshaft for compression of the engine combustion air.

Superchargers so far used for the supercharging of internal combustion piston engines are inefficient and expensive to manufacture so that they are so far not, in particular, suitable for small motor vehicle engines. Because of its satisfactory torque characteristic at low engines speeds, however, a mechanically driven displacement supercharger would seem inherently to be most suited for small private cars. The high costs of manufacture as noted, that more specially arise because it is hardly possible to make the air flow match requirements as based on the operating condition at a given time, and the high driving power that has to be delivered by the crankshaft, have so far greatly limited the use of mechanically driven superchargers for small vehicles.

The object of the present invention is to so design an internal combustion engine of the sort noted at the outset herein that supercharger operation is worthwhile even in small vehicles.

In order to realize this object in the case of such an internal combustion engine as noted at the outset, the piston displacement of one single supercharger chamber is made to suit the maximum air requirement of one engine cylinder to be supercharged, the stroke rate of the supercharging chamber or chambers of the supercharger is equal to the ignition frequency of the engine and the phase of piston motion of the supercharger bears a given relation to the piston motion of the engine in line with the desired supercharging effect.

The outcome of this is that it is then possible to supercharge with a relatively low power requirement, because the air from the supercharger may be displaced directly into the respective engine cylinder that is to be filled so that no energy is needed for forcing out the air into a storage means or for forcing back the engine piston as the precompressed air flows into the engine cylinder.

In keeping with a useful development of the invention, an adjustable pressure controller, functioning as an air flow controller, is placed in the connection between the supercharger and the engine cylinder that is to be supercharged.

As part of particularly beneficial form of the invention a device for changing the phase relationship is placed in the driving connection between the engine crankshaft and the supercharger as an air flow controller.

A still further useful development of the invention which economizes in power is such that the piston displacement of one separate supercharger chamber is equivalent to the maximum amount of air desired in the engine cylinder to be filled less the amount of air drawn in by the engine piston and the phase relationship of the piston motion of the supercharger is so set in relation to the piston motion of the engine that the supercharger forces the maximum desired amount of extra air into the engine cylinder during the engine piston motion in the vicinity of bdc (bottom dead center).

It is furthermore possible as part of another development of the invention for the air amount control to be automatically set by the operational parameters of the overall system.

A more detailed account of the invention will now be given using the working examples thereof to be seen in the figures.

BRIEF DESCRIPTION OF THE DRAWINGS

FIG. 3 is a view looking in the direction of the arrow III in FIG. 2.

FIG. 4 shows a modified form of the construction of FIG. 3.

FIG. 5 is a diagrammatic view of a mechanically driven supercharger that may also be used as an expander for the air.

FIG. 8 is a diagram of conventional supercharger operation.

FIG. 9 is a diagram of theoretical, known belated supercharging.

FIG. 10 is a diagram of a first form of the method of the invention.

FIG. 11 is a diagram of a second form of the method of the invention.

DETAILED DESCRIPTION OF THE INVENTION

Figure 1:
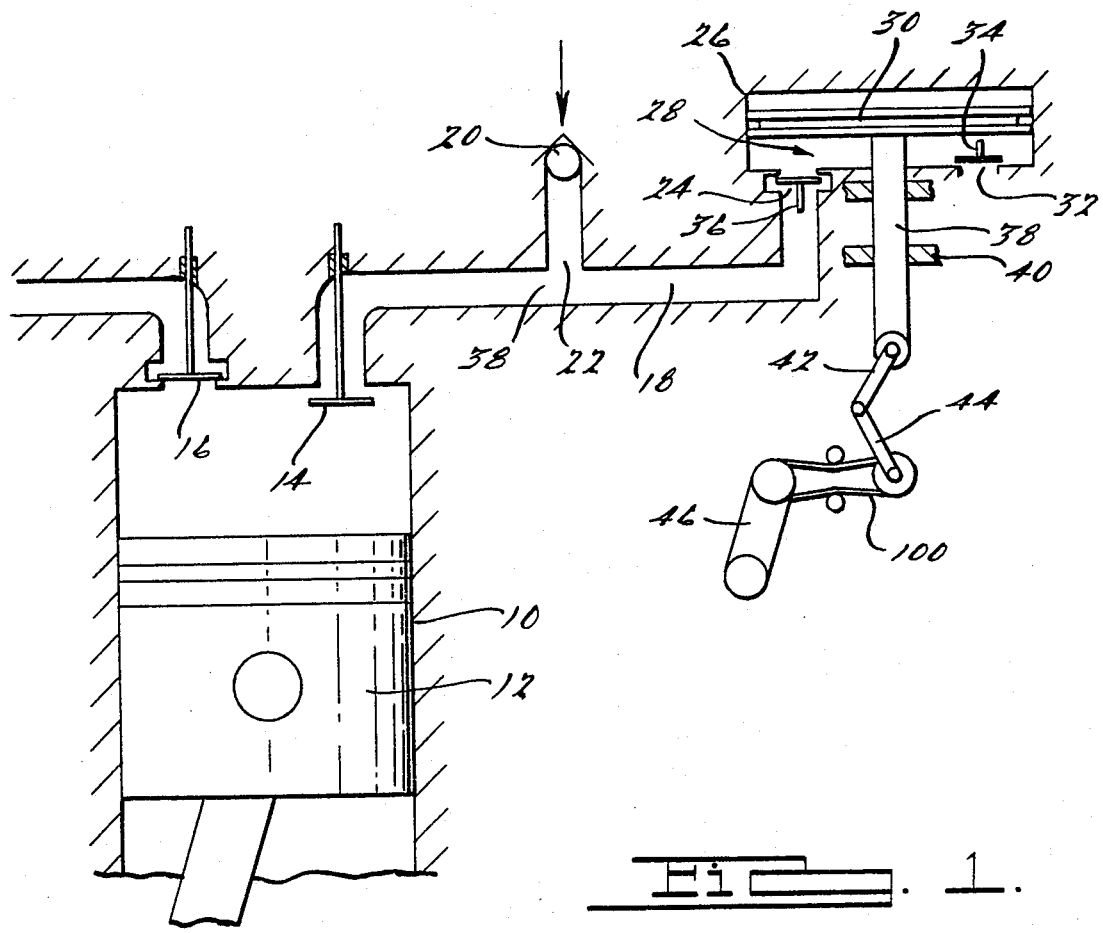
FIG. 1 is a diagrammatic view of a cylinder to an internal combustion engine and of a mechanical supercharger fitted thereto.

In FIG. 1 it will be seen that the cylinder 10 of an engine has a moving piston 12 in it and furthermore an inlet valve 14 and an outlet valve 16. The inlet valve 14 is joined by a duct 18 with a check valve 20 directly with the outside atmosphere and furthermore by way of a branch duct 22 there is a connection with the air outlet 24 of a positive displacement supercharger 26. The duct 18 may have means for shutting it off between the check valve 20 and the branch duct 22.

The positive displacement supercharger 26 has a supercharging chamber 28, in which a partition 30 is placed in the form of a moving flat piston for the inducation of air through an air inlet 32, and to displace the air out through the air outlet 24 into the engine cylinder 10. The air inlet 32 and the air outlet 24 are fitted with check valves 34 and 36. The partition 30 is joined to a guide rod 38, that is movingly guided at a point outside the supercharger chamber 28 by a guide 40 in an axial direction so that the means for sealing and guiding the partition 30 are separated from each other and for this reason friction is cut down to a minimum and there are furthermore favorable effects as regards upkeep and lubrication.

The guide rod 38 is linked by way of a connecting rod 42 with a crank 44, which is able to be driven by a belt drive 100 from the engine crankshaft 46 as will be explained later.

Figure 2:
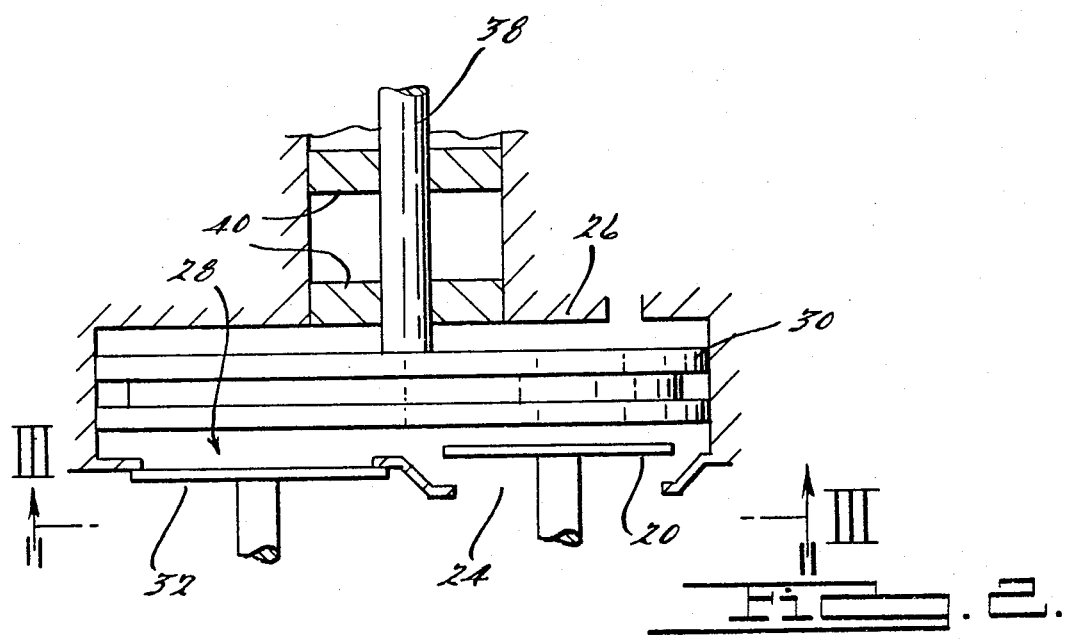
FIG. 2 is a diagrammatic cross section through a supercharger of the same design as in FIG. 1 on a larger scale.

FIG. 2 shows a similar form of the supercharger 26, in which case however the air inlet 24 and outlet 32 are placed on the side of the partition 30 that is turned in the opposite direction to the guide rod 38. In the case of this design of positive displacement supercharger the partition 30 may be made very thin, because it is guided by the guide rod 38. On the other hand, with a short stroke, there is a large cross section area for the inlet opening 24 and the outlet opening 32 to be placed in, so that specially beneficial effects are produced on operation of the supercharger.

FIG. 3 shows two possible forms of the cross section of these openings, in which respect on the left there is a plate valve in the form of an air outlet check valve 34 and on the right there is a semi-circular air inlet check valve 36, which may be in the form of a strip spring, for example.

FIG. 4 shows a modification in the case of an oval air inlet cross section, it furthermore being possible to get an optimum opening cross section with round valves as well.

Figure 6:
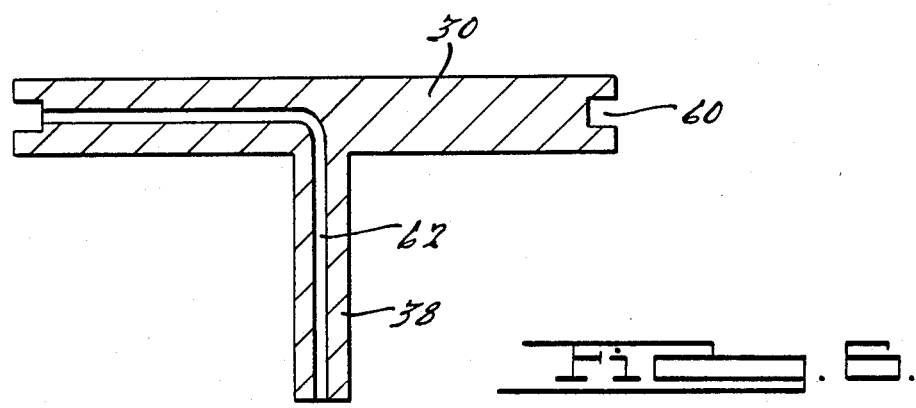
FIG. 6 is a diagrammatic section through a supercharger piston having a leakage vent for gas.

The significant useful effect produced by the mechanically driven displacement supercharger shown is that the mechanical connection with the engine crankshaft 46 makes it possible for the stroke rate of the supercharger chamber or chambers to be kept at a value equal to the ignition rate or frequency of the engine, the mechanical connection furthermore making it readily possible to design for a phase relationship between the motion of the partition 30 and the piston motion of the engine in line with the desired supercharging effect. Furthermore this phase relationship may simply be modified, if desired, as will now be explained on the basis of FIGS. 6 and 7. More specially, this system makes it very simple to regulate the air flow in keeping with the instantaneous operating conditions.

FIG. 5 shows a supercharger 50 of the same design as that of FIG. 1, in which however the partition in the supercharger chamber 28 separates an upper exhaust gas chamber 54 from the lower air chamber 52, such upper chamber 54 having an exhaust gas inlet 56 and an exhaust gas outlet 58. Therefore the supercharger 50 may also be used as an expander, where the exhaust gas coming in via the exhaust gas inlet 56 from the engine cylinders performs work on the partition 30 when expanding, such work then serving to assist in driving the engine crank shaft. In this respect the exhaust gas and the combustion air are only separated by the partitions 30. To improve the sealing effect the outer edge face of the partition 30 has a groove 60 with glands placed on the two sides thereof running round the outer limit of the partition 30. The groove 60 is, as may be seen from FIG. 6, joined by a duct 62 running along inside the guide rod 38 with the outside atmosphere.

Figure 7:
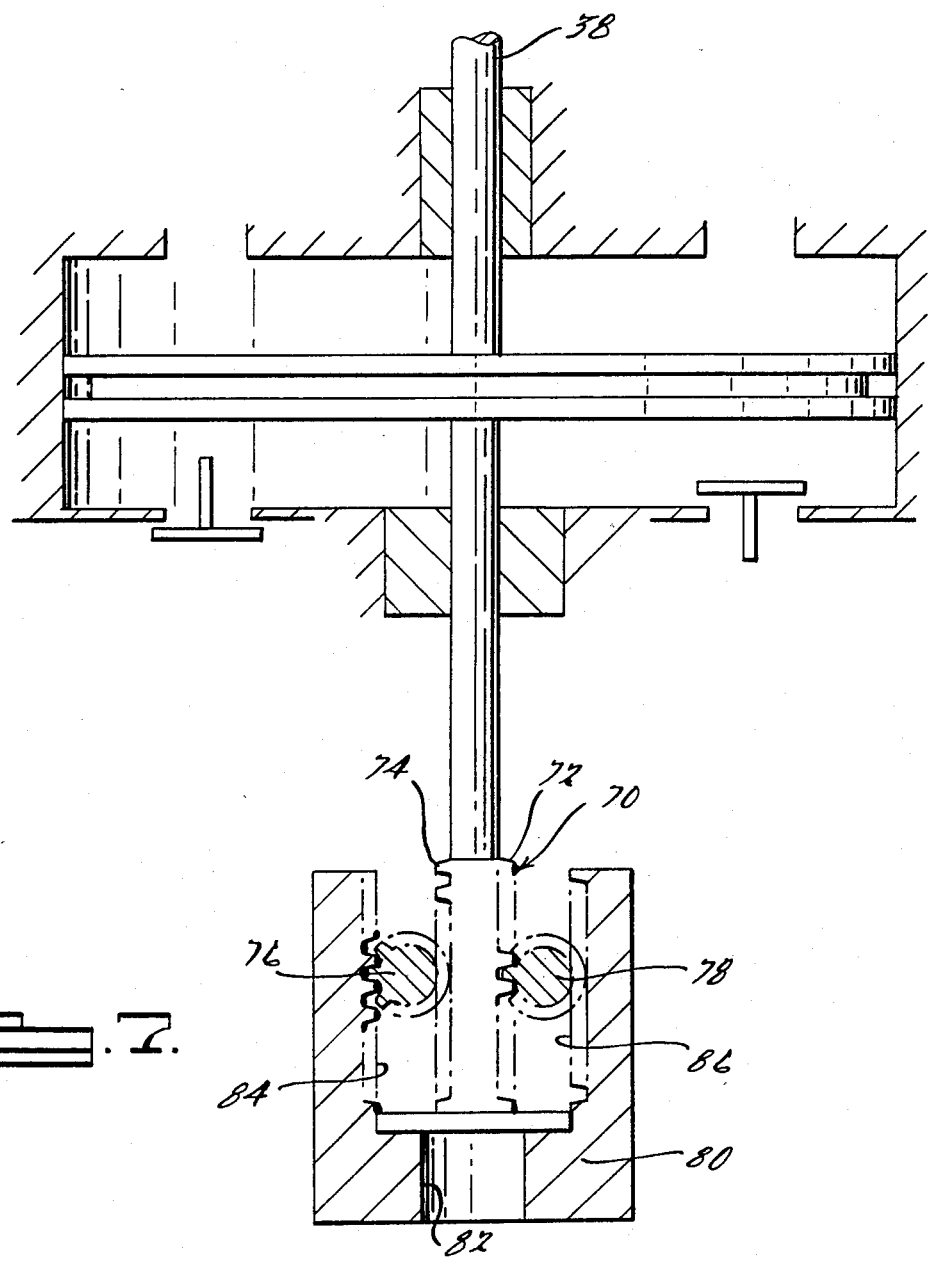
FIG. 7 is a view of a further form of supercharger with a balancing weight arrangement to balance inertia.

FIG. 7 shows one possible way of balancing the inertia of the partition 30. To this end the guide rod 38 is designed with racks on both sides of its section 70 which is at least as long as the stroke of the rod. These two racks 72 and 74 mesh with stationary pinions 76 and 78 respectively. There is a balancing or counter weight 80 that has an opening 82 for the guide 38 to move through, and it has two parallel racks 84 and 86 meshing with the sides of the pinions 76 and 78 facing away from the guide rod 38, so that the balancing weight will always move in a direction opposite to that of the partition 30.

Using the mechanically driven supercharger described herein the engine cylinder 10 may be supplied directly with the air needed for a cycle, there being two modes of operation in this respect. It is on the one hand possible for combustion air to be taken in during the suction stroke by the engine piston 12 while concurrently air is forced out of the supercharger, as for example the supercharger 26 in FIG. 1, into the engine cylinder 10 so that there is a concurrent operation of the supercharger 26 with the suction stroke, for which reason this mode of operation may termed "concurrent supercharging". On the other hand however it is possible for air firstly only to be drawn in by the piston 12 and for such air to be followed only later near the bdc of the piston 12 when the supercharger 26 supplies compressed air, such operation being termed "direct delayed supercharging".

To make possible a better understanding, an account will now be given of "concurrent supercharging" and the "direct delayed supercharging" using FIGS. 8 to 11 to make a comparison with known methods. In each of these graphs the horizontal axis represents the displacement volume of the supercharger chamber corresponding to the piston motion, the air requirement in all the examples being 1.5 liters and the volume of combustion chamber to be filled being 1 liter, the desired compression ratio being therefore 1.5 to 1. Dead space in the system is neglected. The upright graph axis represents pressure, in which respect the pressure P1 is the atmospheric pressure and the pressure P2 is the final supercharging pressure in the engine cylinder. The position UT on the horizontal axis represents bdc, i.e. the position of the positive displacement supercharger in which within its working cycle the supercharging chamber has its greatest volume. OT marks the tdc position, i.e. the position of the positive displacement supercharger in which the supercharging chamber has the minimum volume within its working cycle.

The graph of FIG. 8 represents motion and changes in pressure in the case of conventional supercharging. In this case the combustion air is firstly compressed from the atmospheric pressure P1 to the supercharging pressure P2 and then forced out of the positive displacement supercharger into an intermediate storage device (air manifold or distributor), whence the compressed air then flows into the engine cylinder. In the plot of the pressure changes it is assumed that the storage means is infinitely large for simplification so that the pressure P2 is kept constant after the compression.

In FIG. 8 there is no direct relationship between the timing of the compression stroke of the supercharger and the suction stroke of the engine piston, because the air will have reached its cylinder-filling pressure any time before the suction stroke of the engine piston. It will be seen that there is a relatively small amount A1 of the work to be performed, i.e. the compression work, and a relatively large amount A2, that represents the work needed to expel the compressed air out of the supercharger into the buffer formed by the intermediate storage means or air manifold, which will generally have a capacity of several times the displacement of one engine cylinder or a supercharger chamber respectively. In the supercharging operation in FIG. 8 the compressed air makes its way into the engine cylinder right from the start of the induction stroke, i.e. as from the opening of the inlet valve. Although the energy A2 is more or less completely recovered when the combustion air fills the engine cylinder and forces back the engine piston, this work A2 has to be furnished by the supercharger and because of the efficiency (depending on involved factors) of about 0.33 there is a substantial loss in power and an increase in fuel consumption.

FIG. 9 shows operation of a theoretically known method in delayed supercharging. In this case it is only the volume equal to the difference between the desired air requirement and the volume of the engine cylinder to be supercharged that is compressed by the positive displacement supercharger. However this differential volume has to be compressed to a high pressure designated by P3 and it is expelled at this high pressure into a storage means, the work of compression being denoted as A3 and the work of expulsion being denoted A4. The compressed air goes out of the storage means towards the end of the suction stroke after the opening of a timing valve and passes into the engine cylinder.

But for the synchronization of the timing valve, no synchronization between the motion of the positive displacement supercharger and the piston of the engine cylinder to be filled is necessary or made possible in the supercharging operation according to FIG. 8 or in the case of conventional delayed supercharging as in FIG. 9. The useful effects of the invention stem from such synchronization that is so designed that the air displaced from the supercharger flow directly—without any intermediate storage means—into the engine cylinder. FIGS. 10 and 11 will show two different forms of this method of operation.

In the method illustrated in FIG. 10 the expulsion and compression stroke of the positive displacement supercharger lasts for the whole duration of the suction stroke of the engine piston. The combustion air is drawn in by the piston moving in the cylinder and concurrently with this the air is expelled from the positive displacement supercharger, and because of the larger displacement of the supercharger, said air is at the same time compressed from the atmospheric pressure P1 to the final supercharging pressure P2, for which reason this form of the method will be termed "concurrent supercharging". This effect may be made even more pronounced by a "retarding" phase shift of the supercharger piston.

In the case of such concurrent supercharging the air volume pumped by the positive displacement supercharger is equal to the volume pumped in conventional supercharging as represented in FIG. 8, with the difference however that the supercharging pressure P2 is only reached at the end of the compression stroke of the positive displacement supercharger, that is to say tdc, coinciding in time with the end of inlet into the engine cylinder in question. As will be seen from a comparison between FIGS. 8 and 10, the amount of work performed is less. The saving in work is marked E1.

FIG. 11 shows a method which represents a still further improvement, in which the air also flows directly out of the displacement supercharger into the engine cylinder and in which the energy requirement is reduced still further. In this method the engine piston firstly draws in air at atmospheric pressure without, for the moment, any combustion air from the displacement supercharger being compressed and expelled. It is only when the piston in the engine cylinder is near bdc, i.e. shortly before the inlet is shut, the differential volume is propelled by the displacement supercharger directly into the engine cylinder in order to bring the drawn-in air that is still at atmospheric pressure up to the desired charge pressure P2. Unlike theoretical known delayed supercharging as in FIG. 9, the compression of the differential air volume in this case is strictly timed in relation to the piston motion in the engine cylinder and forced directly out of the displacement supercharger into the combustion chamber, for which reason this supercharging method is to be termed "direct delayed supercharging".

As will be seen from a comparison between FIGS. 8 and 11 it is during the compression stroke in the case of direct delayed supercharging that the work marked A1 in FIG. 8 is performed, such work causing the pressure in the engine cylinder to go up to the final charging pressure. The saving in work as compared with conventional supercharging is marked as E2. In this method of operation the driving power needed for the supercharging device is—as may be theoretically proved—about 18% of the driving power for conventional supercharging, in the case of which the combustion air is first compressed, expelled into a buffer and then makes its way into the cylinder.

For the "concurrent supercharging" and the "direct delayed supercharging" methods described herein the synchronization of the engine piston and of the supercharging piston is important. As a result a possibility is however opened up of controlling the air flow by shifting the phase relationship between the engine and the supercharger. This is more specially of value for controlling the air flow from a mechanically driven supercharger, as is to be seen from example in FIG. 1, because it is then no longer necessary to have a complex air flow controlling system by changing stroke or speed.

The supercharger 26 to be seen in FIG. 1 is driven by a belt drive generally referenced 100 from the engine crankshaft 46, the belt drive 100 comprising a means to make it possible to change the phase relationship between the engine crankshaft 46 and the crank 44 driving the supercharger 26. This means will be described in more detail in connection with FIGS. 12 and 13.

With "direct delayed supercharging" the engine cyinder 10 (see FIG. 1) is completely filled, when the peak of the pressure increase produced by the supercharger 26 is exactly synchronized with the shutting of the inlet valve 14 of the engine cylinder 10. If this timing is changed so that the end of the pumping stroke of the supercharger is no longer at the "optimum" point in time, at which the inlet valve closes, the maximum pressure P2 in the cylinder will not be reached and the degree of filling will be less.

In this respect the supercharger may be advanced or retarded in relation to the motion of the engine piston 12. If the supercharger comes to the end of its pumping stroke before the inlet valve 14 shuts, the suction by the engine piston 12 and the pumping of air by the supercharger 26 will overlap to a greater degree and the overall amount of air drawn in by the piston in the engine cylinder 10 during the stroke will correspondingly be cut down. If the supercharger comes to the end of its pumping stroke after the closing of the inlet valve 14, it will no longer be possible for the full pumped volume of the supercharger to get into the engine cylinder and the degree of filling will again be less. However in this case in the final phase of the pumping stroke the supercharger will firstly be performing useless work. The pressure built up in the suction duct of the engine as a result may however be useful after the opening of the inlet valve 14 in order to scavenge the engine cylinder 10.

Figure 12:
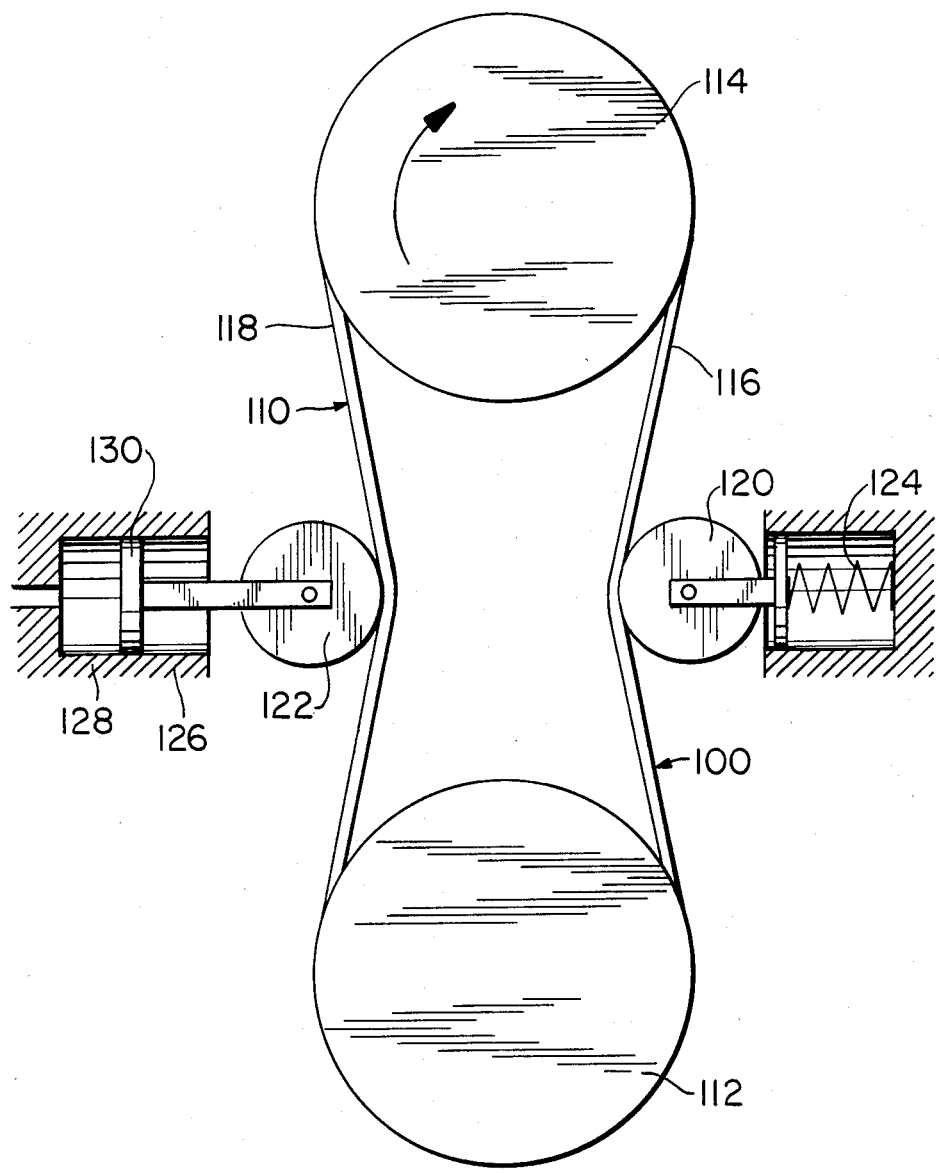
FIG. 12 is a diagrammatic side view of a belt drive designed as a mechanical link between the supercharger and the engine output shaft.

The belt drive 100 to be seen diagrammatically in FIG. 12 comprises a belt 110, preferably a toothed one, that runs over four pulleys in all, namely a driving pulley 114, a driven pulley 112 and two further pulleys, i.e. a pulley 120 placed against the belt run moving from the driven pulley 112 to the drive pulley 114 and able to be moved in a direction normal to the direction of motion of the belt, and furthermore a pulley 122 that may be adjusted in a direction across the direction of belt motion. In other words, the pulley 120 is on the return run 116 of the belt 110 and the pulley 122 is on the driving run 118 of the belt 110. This arrangement is an efficient one because the pulley 120 is pressed by a spring 124 against the belt 110 in order to keep up the desired belt tension. If (in a case in which the pulley 120 were to run on the driving run of the belt) it were possible for the pulley 120 to flutter somewhat transversely in relation to the direction of the motion of the belt independently of any motion caused by an adjustment of the pulley 122, the engagement of the pulley 120 with the driving run would cause small uncontrolled changes in length of the driving run and for this reason a departure from absolutely regular running of the driving pulley 114 and of the driven pulley 112.

On the other hand the pulley 122 may be positively and definedly adjusted in its position normal to the direction of running of the belt 110, the pulley 122 is here mounted in a piston rod 126, that is joined with the piston 130 sliding in a piston 128, such piston being able to be acted upon on both sides hydraulically, i.e. the cylinder 128 with the piston 130 is a double acting hydraulic actuator which may be used for exact adjustment of the position of the pulley 122. Hydraulic operation makes possible a simple regulation of the phase of the belt drive as a function of externally ascertained parameters, for example the operating data of the motor vehicle and of its IC engine, when the belt drive is used for valve operation of the engine in keeping with the example noted in the introduction hereof.

If the pulley 122 in FIG. 8 is moved to the right, the driving belt run 188 becomes longer, whereas the return run 116 is representatively shortened so that the driven pulley is advanced in relation to the driving pulley. If the pulley 122 is moved in the opposite direction, the driving belt run 118 will gradually move into its shortest, straightened position, which is preferably such as to represent a retard of the driven pulley 122 in relation to the driving pulley 114, whereas the phase shift of zero should be roughly in the middle between the two positions of the pulley 122 if the possibility of an advance and of a retard is desired. The arrangement is such, in the case of both working examples, that in the one end position of the adjustable pulley 122 the one belt run 116 or 118 runs in a straightened condition and the respective other belt run 118 or 116 will then have its maximum deflection out of the straightened position. Keeping to this stipulation variations in the placing of the pulleys 120 and 122 are possible. For example, in FIG. 12 the pulley 120 might be placed on the other side of the belt, although then the belt run 116 would have to be pressed thereby not to the left but to the right out of the straightened position. In the arrangement of FIG. 12 the spring 124 has to compensate the adjustment motion of the pulley 122. In the case of the working example of FIG. 13 this is not necessary so that in this case one may have a smaller, stiffer spring.

Figure 13:
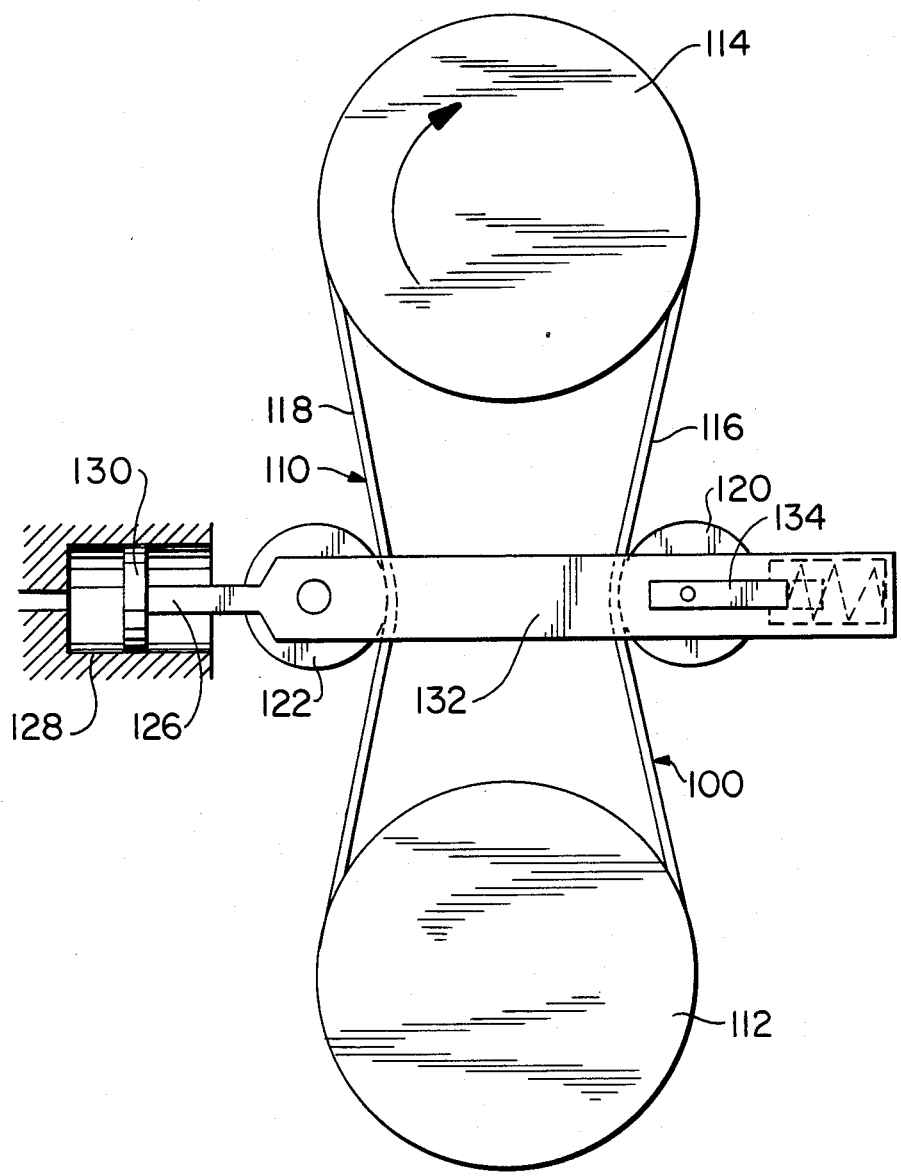
FIG. 13 shows a further form of this belt drive.

In the working example of FIG. 13 the piston rod 126 is joined to a bearing element 132, on which the pulley 122 is bearinged so that the motion of the pulley is limited to a rotary one. The pulley 120 is supported in a slide 134, that may be shifted to a limited degree in the bearing element 132 transversely in relation to the direction of the belt 110, to which end there may be guide slots 136 for mounting the slide 134. The slide 134 is loaded in the bearing element 132 by way of a spring 138. This spring functions generally to keep up the tension of the belt 110 at the desired level.

If the piston 130 is moved, the pulleys 120 and 122 are moved as well. Since the two pulleys 120 and 122 contact with the same face of the belt 110, the one belt run 116 is lengthened by roughly the same amount as the amount by which the other belt run 118 is shortened and the other way round. Slight departures, that occur on leaving the symmetrical position of the two lengths 116 and 118, may be allowed for by the spring 138.

The manner of operation would be the same if the two pulleys 120 and 122 were to be placed on opposite respective sides of the belt, it only being necessary in this case to adopt the arrangement as described at the end of the account of FIG. 2. If one keeps to this condition, i.e. that in the one end position the one belt run is straightened and the other is deflected to the maximum degree, it would be possible, getting the same useful effects as regards the size of the spring 138, for the pulley 120 also to be mounted with the help of the slide 134 in a bearing element which would be driven in the opposite direction to the piston rod 126 and the pulley 122 bearing thereon, even although this arrangement would seem to be of lesser utility because of the more complex mechanical design. However it will be clear that the teaching of the invention may be put into practice in a number of very different ways and is not limited to the examples explained herein.

To be able to adjust the belt tension, it is preferred that the force of the spring 124 or 138 be adjustable, as is known in connection with belt drives.

In place of the crank drive 100 described above and shown in the drawing it would be possible to use other means for the transmission of power mechanically or hydraulically for example, inasfar as they make it possible for the phase relationship between the driven and drive members to be varied.

For the "direct delayed supercharging" of multicylinder engines it is of advantage for the supercharger to be driven at a speed of twice that of the crankshaft and for the number of the supercharging chambers to be half as large as the number of engine cylinders in order to make the expulsion phase of the supercharger shorter than the induction stroke of the engine.

What is claimed is:

1. A positive displacement supercharger adapted for use with an internal combustion engine, comprising:
   said supercharger having a chamber with an internally moving piston, wherein the displacement of said supercharger piston in said chamber is related to the maximum air requirement of one of the cylinders of said engine,
   duct means for conducting pressurized air from said supercharger to said engine including a branch duct which permits said engine to draw atmospheric air by suction,
   a mechanical drive for driving said supercharger in a timed relationship with said engine such that the motion of the pistons of said engine and said supercharger have a phase relationship such that pressurized air is supplied by said supercharger to said engine cylinder at a point in the operating cycle of said engine where the engine piston is near its bottom dead center position, check valve means coupled with said branch duct enabling atmospheric air to be drawn through said branch duct during one portion of the suction stroke of said engine cylinder and pressurized air is provided by said supercharger during another portion of said suction stroke.

2. The positive displacement supercharger according to claim 1 wherein said mechanical drive is capable of varying the phase relationship between said movements of said engine piston and said supercharger piston.

3. The positive displacement supercharger according to claim 1 wherein said branch duct further comprises a one-way check valve which permits atmospheric air flow only toward said engine cylinder.

4. The positive displacement supercharger to claim 2 wherein said mechanical drive comprises a crankshaft of said engine, a belt which engages a driving pulley connected to said crankshaft of said engine, a crankshaft of said supercharger, said crankshaft of said supercharger having a driven pulley connected to said crankshaft of said supercharger, said belt engages said driven pulley such that said belt defines a driving run between said pulleys on one side of said pulleys, and defines a slack run between said pulleys on another side of said pulley said drive further including one or more adjusting rollers acting on both said driving and slack runs for changing the length of said runs, thereby changing the phase relationship between said engine crankshaft and said supercharger crankshaft.

5. The positive displacement supercharger according to claim 1 wherein the speed of rotation of said supercharger is some multiple of the speed of rotation of said engine wherein said supercharger supplies air to a number of said engine cylinders equal to said multiple.

* * * * *

UNITED STATES PATENT AND TRADEMARK OFFICE
CERTIFICATE OF CORRECTION

PATENT NO. : 4,643,156

DATED : February 17, 1987

INVENTOR(S) : Oskar Schatz

It is certified that error appears in the above-identified patent and that said Letters Patent is hereby corrected as shown below:

Column 2, Line 12 "to" should be --of--

Column 6, Line 42 "cyinder" should be --cylinder--

Column 7, Line 39 "IC" should be --internal combustion--

Signed and Sealed this

Eleventh Day of August, 1987

*Attest:*

DONALD J. QUIGG

*Attesting Officer*   *Commissioner of Patents and Trademarks*